US012620140B2

(12) United States Patent
Förberg et al.

(10) Patent No.: US 12,620,140 B2
(45) Date of Patent: May 5, 2026

(54) BUFFERING A GRAPHICAL OVERLAY TO BE APPLIED TO AN IMAGE

(71) Applicant: Axis AB, Lund (SE)

(72) Inventors: Johan Förberg, Lund (SE); Johan Nyström, Lund (SE); Ludvig Hassbring, Lund (SE)

(73) Assignee: AXIS AB, Lund (SE)

( * ) Notice: Subject to any disclaimer, the term of this patent is extended or adjusted under 35 U.S.C. 154(b) by 138 days.

(21) Appl. No.: 18/599,237

(22) Filed: Mar. 8, 2024

(65) Prior Publication Data

US 2024/0355014 A1     Oct. 24, 2024

(30) Foreign Application Priority Data

Apr. 18, 2023     (EP) ..................................... 23168392

(51) Int. Cl.
G06T 9/00          (2006.01)
(52) U.S. Cl.
CPC ................ G06T 9/005 (2013.01); G06T 9/00 (2013.01); G06T 2210/08 (2013.01)
(58) Field of Classification Search
None
See application file for complete search history.

(56) References Cited

U.S. PATENT DOCUMENTS 5,295,235 A * 3/1994 Newman ................ G06T 15/80
                                                           358/1.9
5,731,847 A     3/1998 Tsukagoshi

| | | | | |
|---|---|---|---|---|
| 5,912,672 | A | * | 6/1999 | Liguori ................ G06T 11/203 |
| | | | | 345/619 |
| 6,233,021 | B1 | | 5/2001 | Winter |
| 6,256,415 | B1 | | 7/2001 | Ratnakar |
| 6,259,810 | B1 | * | 7/2001 | Gill ......................... G06T 9/005 |
| | | | | 382/233 |
| 6,366,699 | B1 | * | 4/2002 | Kuwano .............. H04N 21/426 |
| | | | | 382/199 |
| 9,396,697 | B2 | | 7/2016 | Adlers et al. |
| 2001/0055124 | A1 | * | 12/2001 | Varga ..................... G06K 15/00 |
| | | | | 358/1.15 |
| 2005/0015250 | A1 | * | 1/2005 | Davis .................. G06F 3/03545 |
| | | | | 704/E15.044 |

(Continued)

FOREIGN PATENT DOCUMENTS

| | | |
|---|---|---|
| JP | 2009-296071 A | 12/2009 |
| KR | 10-2004-0013689 A | 2/2004 |

*Primary Examiner* — Jeffrey J Chow
(74) *Attorney, Agent, or Firm* — XSENSUS LLP

(57)          ABSTRACT

A device and a method for buffering a graphical overlay to be applied to an image is disclosed. A graphical overlay description specifying content, size, and position in the image of a graphical element of the graphical overlay is obtained, and the graphical overlay is divided into a plurality of sequential line fragments. For each line fragment it is determined, using the graphical overlay description, whether the line fragment overlaps a part of the graphical element. On condition that the line fragment overlaps a part of the graphical element, information representing the part of the graphical element is buffered in a buffer memory for the line fragment. On condition that the line fragment does not overlap any part of the graphical element, a run-length coding representing identical pixels is buffered in the buffer memory for the line fragment.

15 Claims, 3 Drawing Sheets

(56)  References Cited

U.S. PATENT DOCUMENTS

| 2006/0140496 A1 | 6/2006 | Gandolph et al. | |
|---|---|---|---|
| 2007/0285439 A1 | 12/2007 | King et al. | |
| 2010/0225971 A1* | 9/2010 | Yokose | H04N 1/3873 |
| | | | 358/1.18 |
| 2010/0253848 A1 | 10/2010 | Nagajjanavar | |
| 2012/0120320 A1* | 5/2012 | Chowdhry | H04N 9/75 |
| | | | 345/547 |
| 2012/0218292 A1 | 8/2012 | Nyczyk | |
| 2013/0162679 A1 | 6/2013 | Kim et al. | |
| 2014/0241640 A1* | 8/2014 | Panek | G06T 9/00 |
| | | | 382/232 |
| 2014/0320527 A1 | 10/2014 | Cohen et al. | |
| 2020/0210121 A1* | 7/2020 | Crampton | G06F 3/1215 |

* cited by examiner

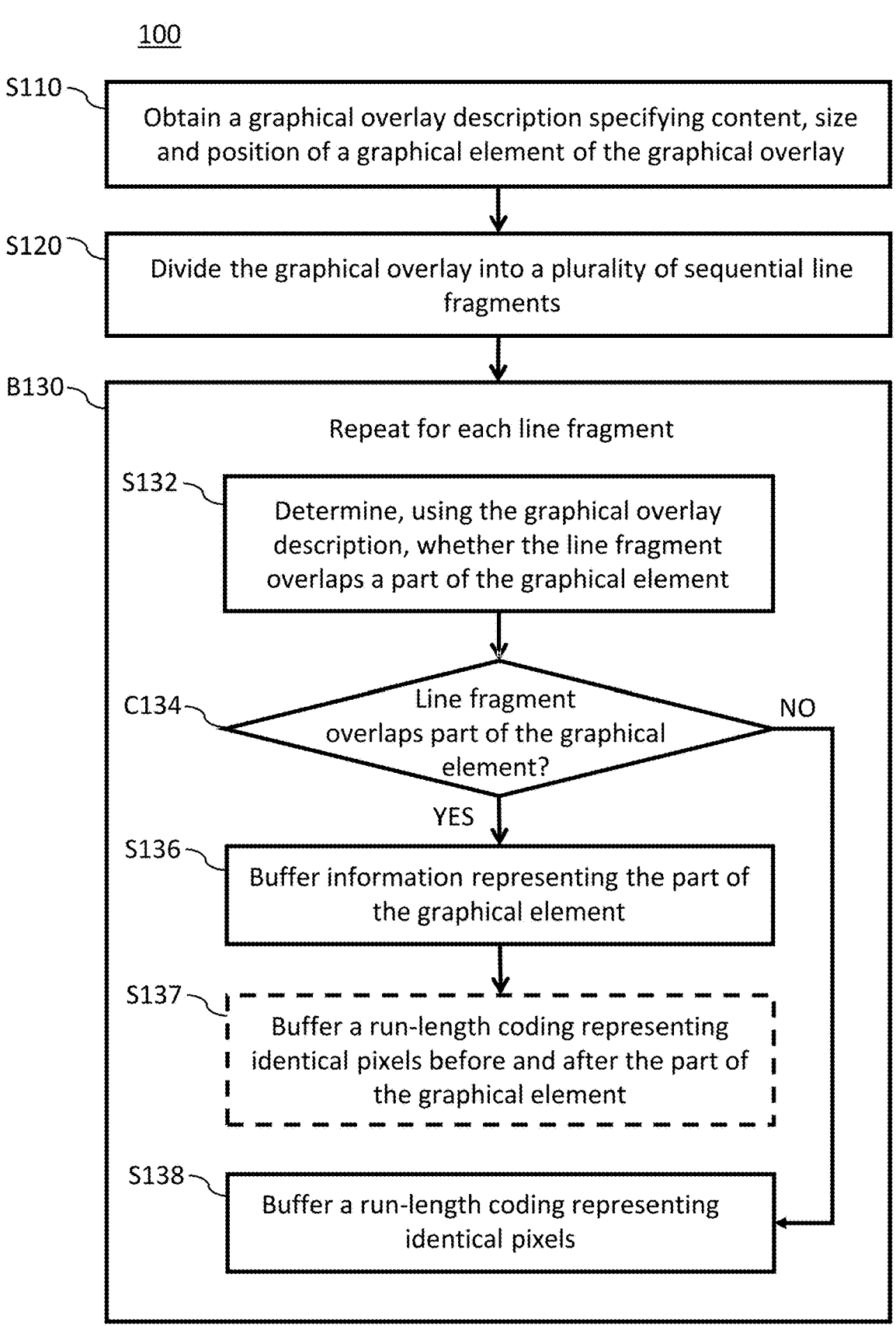

100

S110 — Obtain a graphical overlay description specifying content, size and position of a graphical element of the graphical overlay S120 — Divide the graphical overlay into a plurality of sequential line fragments B130 — Repeat for each line fragment S132 — Determine, using the graphical overlay description, whether the line fragment overlaps a part of the graphical element C134 — Line fragment overlaps part of the graphical element?    NO

YES

S136 — Buffer information representing the part of the graphical element

S137 — Buffer a run-length coding representing identical pixels before and after the part of the graphical element S138 — Buffer a run-length coding representing identical pixels

Figure 1

BUFFERING A GRAPHICAL OVERLAY TO BE APPLIED TO AN IMAGE

CROSS-REFERENCE TO RELATED APPLICATION

This application claims priority to European Patent Application No. 23168392.1 filed on Apr. 18, 2023, the entire disclosure of which is incorporated by reference herein.

TECHNICAL FIELD

The present invention relates to graphical overlays to be applied to an image, and specifically to buffering graphical overlays to be applied to an image.

BACKGROUND

In video applications, such as videos from a monitoring or surveillance camera, a graphical overlay is sometimes added to image frames of the video before encoding. Such an overlay may comprise elements, e.g. in the form of text, numbers, and symbols. The elements may for example be static tags (such as an indication of what the camera is showing, e.g. Entrance, Building X etc), time stamps, information text, a company name and/or logotype. When the overlay is to be added to an image frame of a video, the overlay is typically stored in a buffer memory, e.g. as a bitmap. Data describing the overlay is then read out from the buffer memory and combined with data relating to the image frame to which the overlay should be added. This will require a rather large buffer memory. For example, if the overlay is stored as a bitmap and should be able to include elements in all of the image frame, the buffer memory will have to be large enough to store a bitmap of a size corresponding to the size of the image. In order to reduce the size of the buffer memory for buffering the overlay, the possibility to include the overlay may be restricted to certain one or a few portions of the image frame.

SUMMARY OF THE INVENTION

To overcome or at least mitigate the above identified drawbacks in prior art, the present disclosure provides an improved method of buffering a graphical overlay to be applied to an image, a corresponding device, and a non-transitory computer-readable storage medium as defined in the accompanying independent claims.

The invention makes use of the realization that graphical overlays typically comprise a large portion of transparent pixels since the graphical overlay in most cases is intended to add information whilst not obscuring a large portion of the image frame. However, even the transparent pixels take up space in a buffer memory that the graphical overlay is stored in before being added to an image. It is thus desirable to provide a method for buffering the graphical overlay that reduces the required size of the buffer memory in which the overlay is buffered.

According to a first aspect, a method for buffering a graphical overlay to be applied to an image is provided. A graphical overlay description specifying content, size, and position in the image of a graphical element of the graphical overlay is obtained, and the graphical overlay is divided into a plurality of sequential line fragments. For each line fragment it is determined, using the graphical overlay description, whether the line fragment overlaps a part of the graphical element. On condition that the line fragment overlaps a part of the graphical element, information representing the part of the graphical element is buffered in a buffer memory for the line fragment. On condition that the line fragment does not overlap a part of the graphical element, a run-length coding representing identical pixels is buffered in the buffer memory for the line fragment.

By dividing the graphical overlay into a plurality of sequential line fragments and buffering run-length coding for line fragments that do not overlap a part of the graphical element, the buffer space needed to buffer the pixels is reduced and hence the size of the buffer for buffering the graphical overlay may be reduced as compared to if information regarding each individual pixels, such as a bitmap representation the complete overlay including also portions that do not overlap a part of the graphical element, were to be buffered. Furthermore, the run-length coding representing identical pixels for the line fragments not overlapping a portion of the graphical element can be efficiently read out from the buffer memory. For example, run-length coding for a line fragment that does not overlap a part of the graphical element will require a lower bandwidth to be read out from the buffer memory as compared to reading out pixel data for each pixel for such a line fragment.

By identical pixels is meant e.g. that the pixels all have the same color and level of transparency, or are all completely transparent pixels.

The information representing the part of the graphical element may be pixel data representing the part of the graphical element. The pixel data representing the part of the graphical element may be obtained from a memory storing pixel data representing the graphical element. The method may then further comprise buffering in the buffer memory, for the line fragment, a respective run-length coding representing identical pixels for pixels before and after the part of the graphical element in the line fragment on condition that the line fragment overlaps a part of the graphical element. By buffering the run-length coding for the pixels before and after the part of the graphical element in the line fragment, the buffer space needed to buffer the pixels is reduced and hence the size of the buffer for buffering the graphical overlay may be reduced as compared if pixel data regarding each individual pixel for the pixels before and after the part of the graphical element in the line fragment were to be buffered. Furthermore, the run-length coding representing identical pixels before and after the part of the graphical element in the line fragment can be efficiently read out from the buffer memory. For example, a run-length coding for the pixels before and after the part of the graphical element in the line fragment will require a lower bandwidth if they are to be read out from the buffer memory in the same amount of time as it would take to read out pixel data for each pixel of the pixels before and after the part of the graphical element.

Alternatively, the information representing the part of the graphical element may be a run-length coding representing identical pixels for the part of the graphical element. By buffering the run-length coding representing identical pixels for the part of the graphical element, the buffer space needed to buffer the pixels is reduced and hence the size of the buffer for buffering the graphical overlay may be reduced as compared to if pixel data regarding each individual pixel for the part of the graphical element were to be buffered. Furthermore, the run-length coding representing identical pixels for the pixels before and after the part of the graphical element can be efficiently read out from the buffer memory. For example, a run-length coding for the pixels before and after the part of the graphical element will require a lower bandwidth to be read out from the buffer memory in the same amount of time as it would take to read out pixel data for each pixel of the pixels before and after the part of the graphical element. The method may then further comprise buffering in the buffer memory, for the line fragment, a run-length coding representing identical pixels before and after the part of the graphical element on condition that the line fragment overlaps a part of the graphical element.

In the act of obtaining the graphical overlay description, the obtained graphical overlay description may further specify content, size, and position in the image of a further graphical element of the graphical overlay. The method then further comprises buffering in the buffer memory, for the line fragment, information representing the part of the further graphical element on condition that the line fragment overlaps a part of the further graphical element, and buffering in the buffer memory, for the line fragment, information representing both the part of the graphical element and the part of the further graphical element on condition that the line fragment overlaps both a part of graphical element and a part of the further graphical element.

The information representing both the part of the graphical element and the part of the further graphical element may be pixel data representing a combination of the part of the graphical element and the part of the further graphical element.

According to a second aspect, a non-transitory computer-readable storage medium is provided having stored thereon instructions for implementing the method according to the first aspect, when executed in a camera having at least a processor and a buffer memory.

According to a third aspect, a device for buffering a graphical overlay to be applied to an image is provided. The device comprises a buffer memory, and circuitry configured to execute an obtaining function, a dividing function, a determining function, and a buffering function. The obtaining function is configured to obtain a graphical overlay description specifying content, size, and position in the image of a graphical element of the graphical overlay. The dividing function is configured to divide the graphical overlay into a plurality of sequential line fragments. The determining function is configured to, for each line fragment, determine, using the graphical overlay description, whether the line fragment overlaps a part of the graphical element. The buffering function configured to, for each line fragment, buffer in the buffer memory, for the line fragment, information representing the part of the graphical element on condition that the line fragment overlaps a part of the graphical element, and buffer in the buffer memory, for the line fragment, a run-length coding representing identical pixels on condition that the line fragment does not overlap a part of the graphical element.

The above-mentioned optional additional features of the method according to the first aspect, when applicable, apply to the device according to the third aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended figures. The figures should not be considered limiting but are instead used for explaining and understanding.

FIG. 1 shows a flow chart in relation to embodiments of a method for buffering a graphical overlay to be applied to an image is provided.

DETAILED DESCRIPTION

Figure 2:
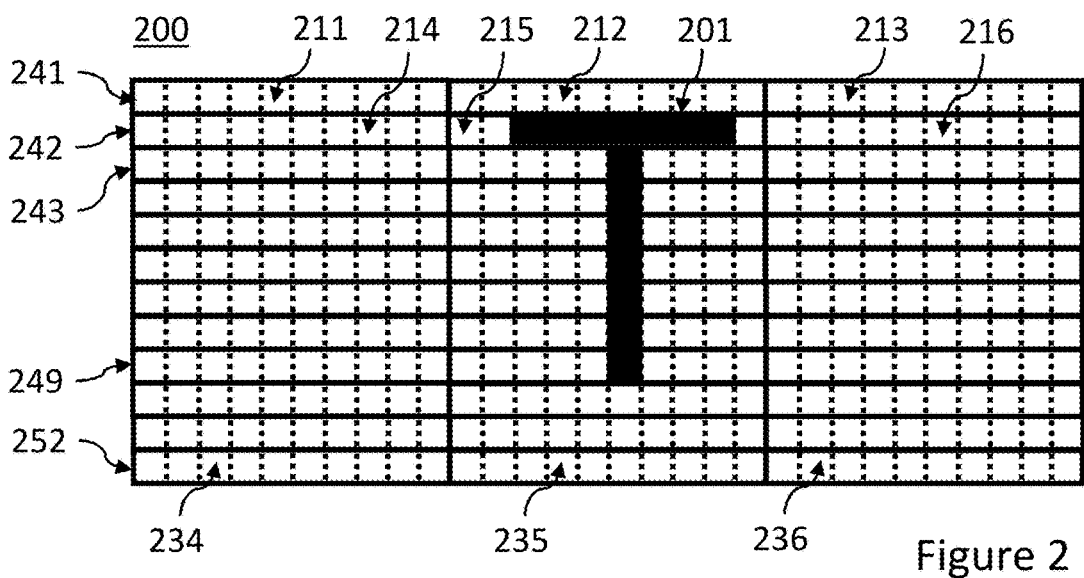
FIG. 2 shows a simplified illustration of a graphical overlay including a graphical element as divided into line fragments.

The present invention will now be described hereinafter with reference to the accompanying drawings, in which currently preferred embodiments of the invention are illustrated. This invention may, however, be embodied in many different forms and should not be construed as limited to the embodiments set forth herein.

In the following, embodiments of a method 100 for buffering a graphical overlay to be applied to an image will be described with reference to FIGS. 1-4.

FIG. 1 shows a flow chart in relation to embodiments of a method 100 for buffering a graphical overlay to be applied to an image. The method 100 comprises obtaining S110 a graphical overlay description specifying content, size, and position in the image of a graphical element of the graphical overlay. The graphical overlay description may be of any type that specifies content, size, and position in the image of the graphical element. For example, the graphical overlay description may include a bitmap representation of the graphical element together with a position in the image of the graphical element. In alternative the graphical overlay description may include a vectorized representation of the graphical element together with a size and a position in the image of the graphical element. If, for example, the graphical element is a character of a particular font and size that should be located in a particular position in the image, this is provided in the graphical overlay description. A bitmap representation of the character of the particular font and size could then be generated by means of rasterization from the characters vectorized representation. The bitmap representation may then be stored in a font atlas which is a single bitmap texture containing all characters of the font and size that have been rasterized from its respective vectorized representation so far. Once a character of a font and size is stored in the font atlas, the bitmap representation in the font atlas for that character of the font and size can be copied ("blitted") from the font atlas when buffering an overlay to be applied to an image comprising the character of the font and size at a position in the image given by the graphical overlay description. The graphical element may for example comprise one or more glyphs or characters, such as letters, numerical digits, etc, a graphical object or design, or a combination thereof. Generally, the graphical element may be intended to convey information to a viewer. Typically, the graphical element will constitute only a limited part of the image it should be overlayed and should cover as small part as possible of the image while for example still convey relevant information to a viewer.

The method 100 further comprises dividing S120 the graphical overlay into a plurality of sequential line fragments. Preferably, all line fragments are of the same size. Each line fragment corresponds to a fragment of a line of pixels in the image such that the line fragment describes a portion of the overlay that should be applied to that fragment of the line of pixels in the image. All line fragments together will correspond to all of the image or one or more selected regions of the image such that each line fragment of the graphical overlay corresponds to a fragment of a line of pixels in the image. Hence, the method 100 can be used for a graphical overlay covering all of or only a portion of the image. Each line fragment should preferably not be too short since in the end the method 100 will use run-length encoding representing identical pixels for line fragments that do not overlap a part of the graphical element and such run-length encoding will compress the data more the longer such line fragments are. On the other hand, if a line fragment is too long, the probability that the line fragment will overlap a part of the graphical element will increase and in such a case, run-length encoding representing identical pixels cannot be used for the whole of that line fragment. The total width of the overlay W divided by the length of the line fragments F should preferably be above a threshold, such as above 64. In some scenarios the length of the line fragments F is selected to 128 pixels. However, this could be adjusted one or two order of magnitude up or down. The size of the line fragments may be set to be optimal for a particular scenario or may be set to be suitable for a range of different scenarios.

Turning now to FIG. 2 which shows a simplified illustration of a division into line fragments of a graphical overlay 200 including a graphical element 201 in the form of the capital letter "T" that should be applied to an image such that each line fragment of the graphical overlay 200 is applied to a corresponding fragment of a line in the image. The description is applicable also mutatis mutandis if the graphical overlay 200 should be applied to a portion of an image. Each line fragment is illustrated as a box with solid lines including ten pixels, the division between which is illustrated with dotted lines. It is to be noted that the size and number of pixels has been adapted for ease of illustration. In a real implementation the number of pixels in a line fragment may be much larger, such as 64, 128 or 256. Similarly, the size of the pixels in relation to the graphical element 201 may be much smaller. There are three line fragments in each line and twelve lines altogether. A first line fragment 211 is a line fragment of a first line 241 from the top of the graphical overlay 200 that should be applied to a first fragment from the left of a first line of pixels from the top of the image. A subsequent second line fragment 212 is a line fragment of the first line 241 that should be applied to a second fragment from the left of the first line of pixels from the top of the image starting from the pixel directly to the right of the last pixel of the first fragment from the left of the first line of pixels from the top of the image. The first line 241 further includes a subsequent third line fragment 213. The first, second, and third line fragments 211, 212, 213 together should be applied to all pixels of the first line of pixels from the top of the image. After the third line fragment a subsequent fourth line fragment 214 is a line fragment in a second line 242 of the graphical overlay 200 that should be applied to a first fragment from the left of a second line of pixels from the top of the image. The second line 322 further comprises a fifth line fragment 215 and a sixth line fragment 216 such that the fourth, fifth, and sixth line fragments 214, 215, 216 together should be applied to all pixels of the second line of pixels from the top of the image. This is then repeated for each consecutive line from the third line 243 to the last line 252 from the top of the graphical overlay 200. Specifically, A 34:th line fragment 234, a 35:th line fragment 235, and 36:th line fragment 236 of the last line 252 together should be applied to all pixels of the last line of pixels from the top of the image. Based on the description into line fragments of the graphical overlay 200 described in relation to FIG. 2 is readily apparent how a graphical overlay of any size may be divided into line fragments of any size.

As illustrated in FIG. 1, a set of acts B130 are then performed for each line fragment. Firstly, it is determined S132, using the graphical overlay description, whether the line fragment overlaps a part of the graphical element. In the graphical overlay description, the content, size, and location in the image of the graphical element is specified. From this, it can be determined for each line fragment whether the line fragment overlaps a part of the graphical element. As can be seen in FIG. 2, the second line fragment from the left in each of the lines from the second line 242 to the ninth line 249 from the top of the graphical overlay 200 overlaps a part of the graphical element 201. Secondly, buffering S136, S138 is performed. What is buffered for the line fragment depends on the result from the determining S132. On condition C134 that the line fragment overlaps a part of the graphical element, information representing the part of the graphical element is buffered S136 in a buffer memory for the line fragment. On condition C134 that the line fragment does not overlap a part of the graphical element, a run-length coding representing identical pixels is buffered S138 in the buffer memory for the line fragment.

For a line fragment that overlaps a part of the graphical element, the information representing the part of the graphical element that is buffered S136 in the buffer memory may for example be pixel data for the part of the graphical element. In some embodiments, pixel data for each of the pixels of the line fragment are buffered S136. In alternative embodiments, pixel data are only stored for each of the pixels overlapping the part of the part of the graphical element. For pixels before and after the part of the graphical element in the line fragment, i.e. before and after the part of the line fragment overlapping the part of the graphical element, a respective run-length coding representing identical pixels may be buffered S137. For example, the identical pixels may be transparent pixels such that these pixels of the overlay will not be visible in the image after applying the graphical overlay, i.e. the original pixels of the image to which the transparent pixels are applied will not be affected by the application of the overlay.

For a line fragment that does not overlap any part of the graphical element, the run-length coding representing identical pixels that is buffered S138 in the buffer memory for the line fragment, may be based on any type of run-length coding. By run-length coding is meant coding that is lossless and that compresses data by, for a number of instances in sequence having the same value, instead of providing the same value for each of the instances, simply identifying the value and the number of instances in sequence to which it applies. For example, run-length coding of input data "aaaabbbcc" may be "a4b3c2". In this case it relates to sequences of identical pixels. Instead of providing pixel data for each pixel. An indication of the pixel data and the number of pixels in sequence having these pixel data is identified. The run-length coding may be done such that, if two consecutive pixels have the same indication of full transparency (alpha value=0), the two consecutive pixels will be encoded as two identical pixels, and if the two consecutive pixels have less than full transparency (alpha value>0), the two consecutive pixels must have identical values for each color channel and identical indication of transparency (alpha value) to be encoded as two identical pixels. Hence, a current pixel will be not be coded as a new entry if it has the same color value for all color channels as a previously coded pixel, or if both the previously coded pixel and the current pixel both are transparent. Identical pixels here may mean pixels having the same color and level of transparency (alpha value), e.g., all being red and all being 50% transparent (alpha value 0.5), or pixels in the same channel all being fully transparent (alpha=0). In the latter case, the color may be different since full transparent pixels will be identical regardless of their color. Generally, identical pixels indicate that the pixels should have the same effect when the overlay is applied to the image. Hence, for example, run-length coding indicating a number of transparent pixels of the overlay, when applied to an image may be included as transparent pixels having different colors, e.g. red transparent pixels and some green transparent pixels. Hence, even if the run-length coding indicates identical pixels this does not require that they all have the same pixel data when they are applied to the image as long as they provide the same (identical) effect in the image, such as all being transparent even if their pixel data indicates different colors. Also, an alternative where the run-length coding indicates that some of the pixels are fully transparent having a first color and the rest of the pixels are fully transparent having a second color is encompassed, instead of simply using a run-length coding indicating that that all of the pixels are fully transparent. However, this will reduce the amount of compression achieved by the run-length coding.

Figure 3:
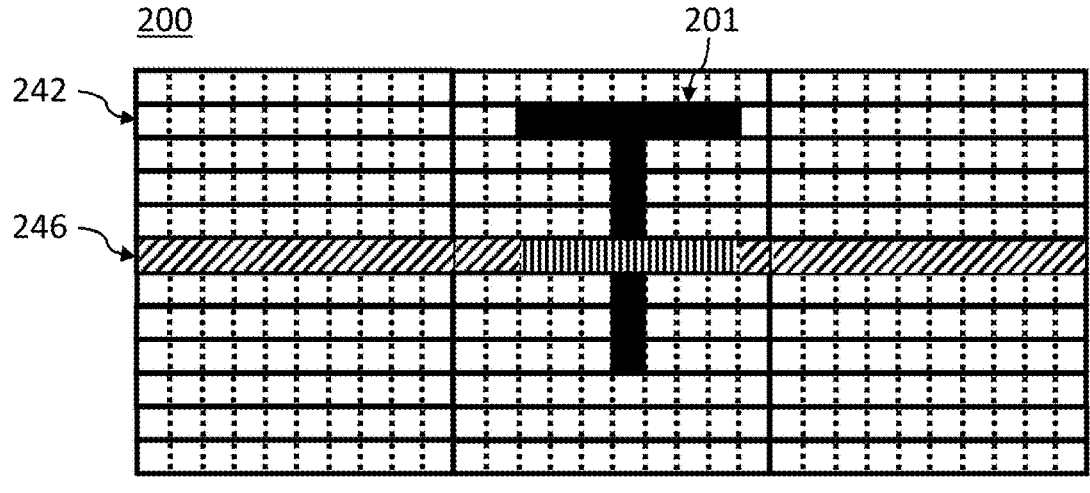
FIG. 3 shows an illustration in relation to buffering of line fragments of the graphical overlay illustrated in FIG. 2.

Turning now to FIG. 3, which shows an illustration in relation to buffering of line fragments of the graphical overlay 200 illustrated in FIG. 2. As an example, the buffering in relation to the first line fragment of the sixth line 246 of the graphical overlay 200 will be described. As can be seen the first line fragment and the third line fragment from the left of the sixth line 246 of the graphical overlay 200 do not overlap any part of the graphical element 201. Hence, a run-length coding representing ten identical pixels are buffered in a memory buffer for the first line fragment and the third line fragment from the left of the sixth line 246 of the graphical overlay 200 which is indicated by these line fragments being marked by diagonal stripes. The second line fragment from the left of the sixth line 246 of the graphical overlay 200 overlaps a part of the graphical element 201 which is indicated by the overlap being marked by vertical stripes. Specifically, the third to ninth pixel of the second line fragment from left of the sixth line 246 of the graphical overlay 200 overlaps a part of the graphical element 201. As can be noted, the overlap covers pixels of the graphical element 201 in the form of the capital letter "T" that are part of the capital letter "T" as such, namely the third to fifth pixels and the seventh to ninth pixels. This definition of the overlap is due to the graphical element 201 being described in the graphical overlay description or as a bitmap or a bitmap has been derived from the graphical overlay description, which bitmap is a seven pixels wide and eight pixels high rectangle.

In one embodiment, pixel data for each pixel of a line fragment overlapping a portion of a graphical element are buffered. In relation to the second line fragment from left of the sixth line 246 of the graphical overlay 200, this would mean that first pixel data for two fully transparent pixels (transparent pixels in the following), followed by pixel data for each of the seven pixels of the part of the graphical element, and finally followed by pixel data for one transparent pixel would be buffered.

In another embodiment, pixel data for each of the pixels are only buffered for the portion overlapping the part of the graphical element 201. The first, second and tenth pixel of the second line fragment from left of the sixth line 246 of the graphical overlay 200 do not overlap any part of the graphical element 201. Hence, respective run-length coding representing identical pixels may be buffered for the first and second pixel of the second line fragment from left the sixth line 246 and the tenth pixel of the second line fragment from left the sixth line 246. Hence, in relation to the second line fragment from left of the sixth line 246 of the graphical overlay 200, this would mean that a run-length coding representing two identical transparent pixels, followed by pixel data for each of the seven pixels of the part of the graphical element, and finally followed by a run-length coding representing one transparent pixel would be buffered. It should be noted that for this particular case buffering run-length coding for these pixels would not result in any compression as compared with storing pixel data for each of the pixels. However, should the line fragments have been substantially longer, the number of pixels before and after the overlap would have been substantially larger and a compression would have resulted from the run-length coding of the transparent pixels before and after the overlap, respectively.

In a further embodiment, run-length coding is buffered also for identical pixels in sequence for the portion overlapping the part of the graphical element 201. Hence, in relation to the second line fragment from left of the sixth line 246 of the graphical overlay 200, this would mean that a run-length coding representing five identical transparent pixels, followed by pixel data for one pixel of the part of the graphical element, and finally followed by a run-length coding representing four transparent pixels would be buffered.

In a further embodiment, all of the pixels of the overlap may be buffered using run-length coding. In this case the graphical element may be described also in the graphical overlay description using run-length coding. For example, in relation to the second line fragment from left of the second line 242 of the graphical overlay 200, this would mean that a run-length coding representing two identical transparent pixels, followed by a run-length coding representing seven identical pixels of the part of the graphical element, and finally followed by a run-length coding representing one transparent pixel would be buffered. It should be noted that for this particular case buffering run-length coding for the transparent pixels would not result in any compression as compared with storing pixel data for each of the pixels. However, should the line fragments have been substantially longer, the number of pixels before and after the overlap would have been substantially larger and a compression would have resulted from the run-length coding of the transparent pixels before and after the overlap, respectively.

The graphical overlay description obtained S110 may further specify content, size, and position in the image of a further graphical element of the graphical overlay. Unless a line fragment overlaps both the graphical element and the further graphical element, the buffering in relation to line fragments may be performed in relation to the further graphical element as described hereinabove in relation to the graphical element.

On condition that a line fragment overlaps both a part of graphical element and a part of the further graphical element, information representing both the part of the graphical element and the part of the further graphical element object may be buffered in the buffer memory for the line fragment.

The information representing both the part of the graphical element and the part of the further graphical element may in some cases be pixel data representing a combination of the part of the graphical element and the part of the further graphical element. For example, in case a line fragment overlaps a part of the graphical element and a part of the further graphical element and the part of the graphical element and the part of the further graphical element also overlap each other, pixel data representing a combination of the part of the graphical element and the part of the further graphical element is preferably buffered. The combination may for example be based on alpha blending.

Figure 4:
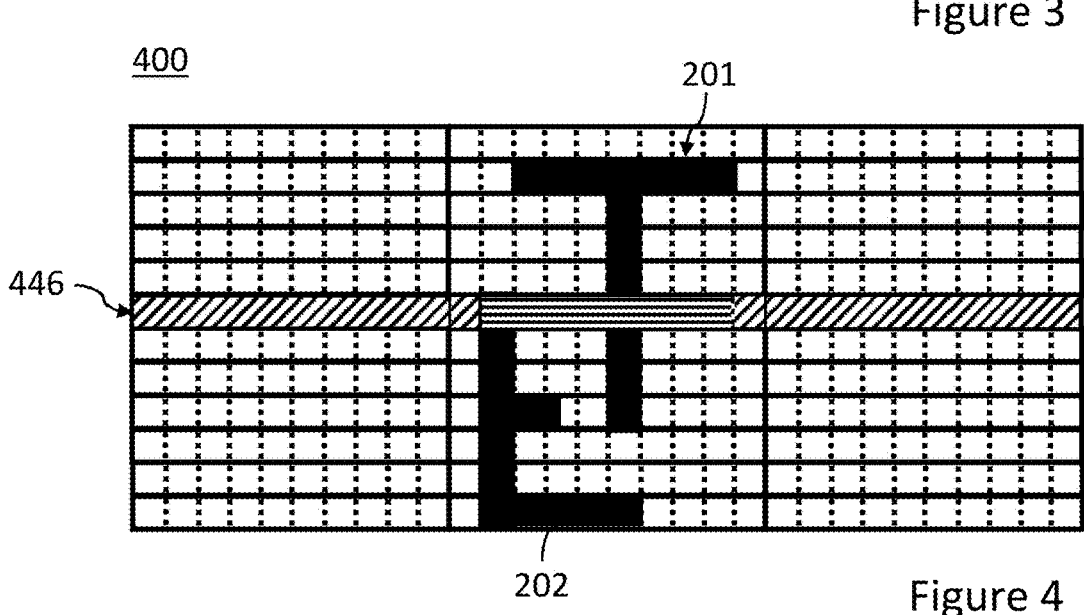
FIG. 4 shows an illustration in relation to buffering of line fragments of a graphical overlay including two graphical elements as divided into line fragments.

Turning now to FIG. 4, which shows an illustration in relation to buffering of line fragments of a graphical overlay 400 of the same size and divided into line fragments in the same way as the graphical overlay 200 in FIG. 2. The difference between the graphical overlay 400 in FIG. 4 and the graphical overlay 200 in FIG. 2 is that the graphical overlay 400 in FIG. 4 in addition to the graphical element 201 in the form of the capital letter "T" comprises a further graphical element 202 in the form of the capital letter "E". As an example, the buffering in relation to the first line fragment of the sixth line 446 of the graphical overlay 400 will be described. As can be seen the first line fragment and the third line fragment from the left of the sixth line 446 of the graphical overlay 400 do not overlap any part of the graphical element 201 or any part of the further graphical element 202. Hence, a run-length coding representing ten identical pixels are buffered in a memory buffer for the first line fragment and the third line fragment from the left of the sixth line 446 of the graphical overlay 400 which is indicated by these line fragments being marked by diagonal stripes. The second line fragment from the left of the sixth line 446 of the graphical overlay 400 overlaps a part of the graphical element 201 and a part of the graphical element 202 which is indicated by the overlap being marked by horizontal stripes. Specifically, the second to ninth pixel of the second line fragment from left of the sixth line 446 of the graphical overlay 400 overlaps a part of the graphical element 201 or a part of the further graphical element 202. The second pixel only overlaps a part of the further graphical element 202 and hence, for that pixel the pixel data for the corresponding pixel of the part of the further graphical element 202 will be buffered. The third to sixth pixels overlap both a part of the further graphical element 202 and a part of the graphical element 201 and hence, for each of those pixels a combination of the pixel data for each of the corresponding pixel of the part of the further graphical element 202 and each of the corresponding pixel of the part of the graphical element 201 will be buffered. For example, the combination may be achieved by alpha blending. The seventh to ninth pixels only overlap a part of the graphical element 201 and hence, for each of those pixels the pixel data for each of the corresponding pixel of the part of the graphical element 201 will be buffered. For the pixels not overlapping any part of the graphical element 201 or any part the further graphical element 202, either pixel data relating to each pixel may be buffered or a run-length coding representing the number of identical pixels.

Figure 5:
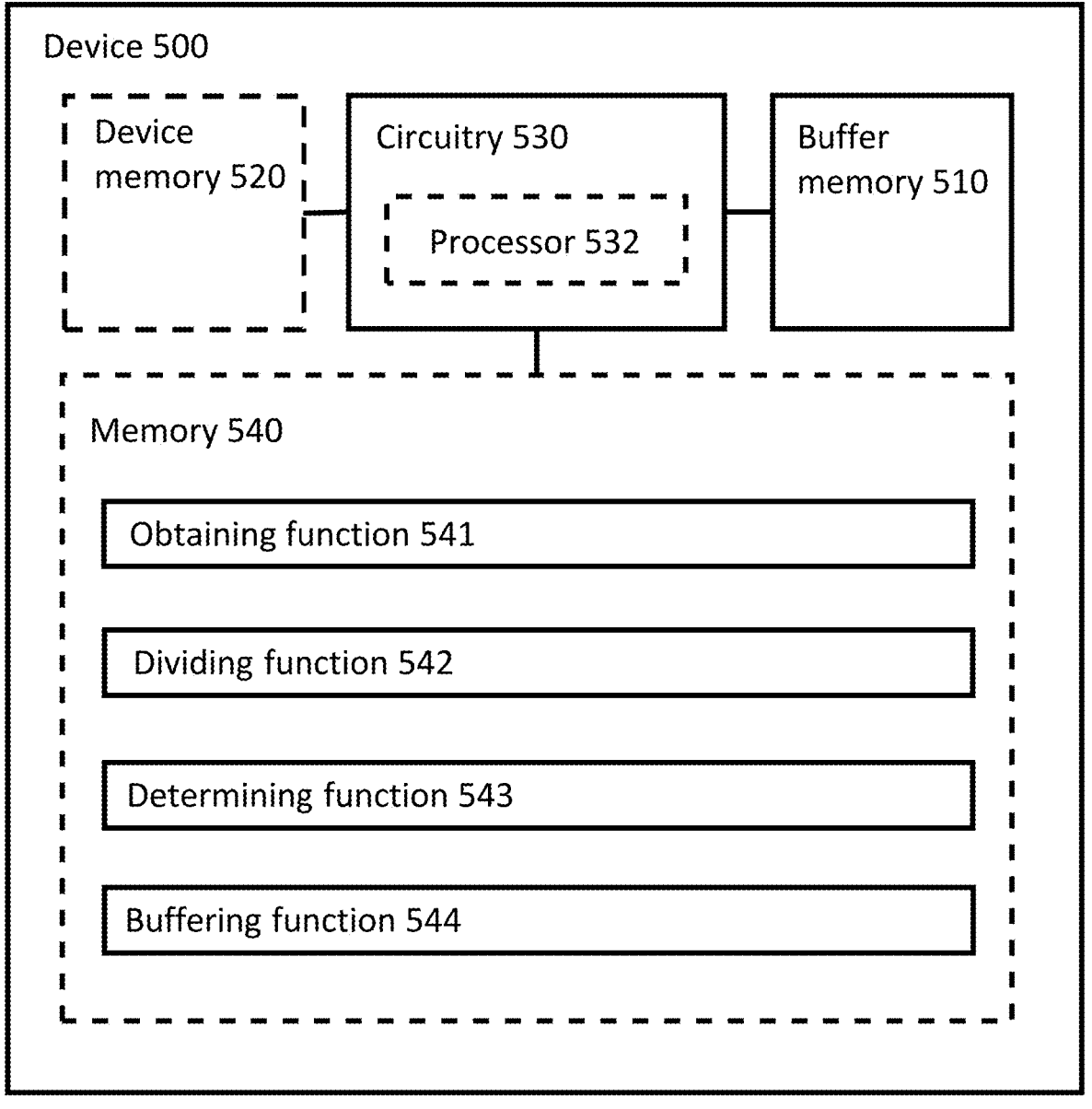
FIG. 5 shows a schematic diagram in relation to embodiments of a device for buffering a graphical overlay to be applied to an image is provided.

FIG. 5 shows a schematic block diagram of embodiments of a device 500 for buffering a graphical overlay to be applied to an image is provided. The device 500 may be any type of device, such as a monitoring camera, a security camera or a surveillance camera.

The device 500 comprises a buffer memory 510 and a circuitry 530. The device 500 may be a camera and will then typically also comprise an encoder (not shown), an image sensor (not shown), and an image processor (not shown).

The circuitry 530 is configured to carry out functions of the device 500. The circuitry 530 may include a processor 532, such as a central processing unit (CPU), microcontroller, or microprocessor. The processor 532 is configured to execute program code. The program code may for example be configured to carry out the functions of the device 500.

The device 500 may further comprise a memory 540. The memory 540 may be one or more of a buffer, a flash memory, a hard drive, a removable media, a volatile memory, a non-volatile memory, a random access memory (RAM), or another suitable device. In a typical arrangement, the memory 540 may include a non-volatile memory for long term data storage and a volatile memory that functions as system memory for the circuitry 530. The memory 540 may exchange data with the circuitry 530 over a data bus. Accompanying control lines and an address bus between the memory 540 and the circuitry 530 also may be present.

The functions of the device 500 may be embodied in the form of executable logic routines (e.g., lines of code, software programs, etc.) that are stored on a non-transitory computer readable medium (e.g., the memory 540) of the device 500 and are executed by the circuitry 530 (e.g., using the processor 532). Furthermore, the functions of the device 500 may be a stand-alone software application or form a part of a software application that carries out additional tasks related to the device 500. The described functions may be considered a method that a processing unit, e.g., the processor 532 of the circuitry 530, is configured to carry out. Also, while the described functions may be implemented in software, such functionality may as well be carried out via dedicated hardware or firmware, or some combination of hardware, firmware and/or software.

The circuitry 530 of the device 500 is configured to execute an obtaining function 141, a reducing function 142, a detecting function 143, and an inserting function.

The obtaining function 541 is configured to obtain a graphical overlay description specifying content, size, and position in the image of a graphical element of the graphical overlay.

The dividing function 542 is configured to divide the graphical overlay into a plurality of sequential line fragments.

The determining function 543 is configured to use the graphical overlay description to determine, for each line fragment, whether the line fragment overlaps a part of the graphical element.

The buffering function 544 is configured to, for each line fragment determined to overlap a part of the graphical element, buffer information representing the part of the graphical element in the buffer memory, and for each line fragment determined not overlap any part of the graphical element, buffer a run-length coding representing identical pixels in the buffer memory.

Further details regarding the functions the circuitry 510 is configured to execute are provided in relation to the corresponding acts of the method 100 for buffering a graphical overlay to be applied to an image as described hereinabove in relation to FIGS. 1-4.

A person skilled in the art realizes that the present invention is not limited to the embodiments described above. On the contrary, many modifications and variations are possible within the scope of the appended claims. Such modifications and variations can be understood and effected by a skilled person in practicing the claimed invention, from a study of the drawings, the disclosure, and the appended claims.

The invention claimed is:

1. A method for buffering a graphical overlay to be applied to an image, wherein the graphical overlay comprises a plurality of horizontal lines of pixels, the method comprising:

obtaining a graphical overlay description specifying content, size, and position in the image of a graphical element of the graphical overlay;

dividing each horizontal line of pixels of the plurality of horizontal lines of pixels of the graphical overlay into a plurality of sequential line fragments, wherein all of the sequential line fragments have a same size; and for each line fragment of the plurality of sequential line fragments:

determining, using the graphical overlay description, whether the line fragment overlaps a part of the graphical element, on condition that the line fragment overlaps a part of the graphical element, buffering in a buffer memory, for the line fragment, information representing the part of the graphical element, and on condition that the line fragment does not overlap any part of the graphical element, buffering in the buffer memory, for the line fragment, a run-length coding representing identical pixels.

2. The method according to claim 1, wherein the information representing the part of the graphical element is pixel data representing the part of the graphical element.

3. The method according to claim 2, wherein the pixel data representing the part of the graphical element are obtained from a memory storing pixel data representing the graphical element.

4. The method according to claim 2, further comprising:

for each line fragment of the plurality of sequential line fragments, on condition that the line fragment overlaps a part of the graphical element, buffering in the buffer memory, for the line fragment, a respective run-length coding representing identical pixels before and after the part of the graphical element in the line fragment.

5. The method according to claim 1, wherein the information representing the part of the graphical element is a run-length coding representing identical pixels for the part of the graphical element.

6. The method according to claim 1, wherein the obtained graphical overlay description further specifies content, size, and position in the image of a further graphical element of the graphical overlay, the method further comprising:

for each line fragment of the plurality of sequential line fragments:

on condition that the line fragment overlaps a part of the further graphical element, buffering in the buffer memory, for the line fragment, information representing the part of the further graphical element, and on condition that the line fragment overlaps both a part of graphical element and a part of the further graphical element, buffering in the buffer memory, for the line fragment, information representing both the part of the graphical element and the part of the further graphical element.

7. The method according to claim 6, wherein the information representing both the part of the graphical element and the part of the further graphical element is pixel data representing a combination of the part of the graphical element and the part of the further graphical element.

8. A non-transitory computer-readable storage medium having stored thereon instructions for implementing the method according to claim 1 when executed in a device having a processor and a buffer memory.

9. A device for buffering a graphical overlay to be applied to an image, the graphical overlay comprising a plurality of horizontal lines of pixels, the device comprising:

a buffer memory; and circuitry configured to execute:

an obtaining function configured to obtain a graphical overlay description specifying content, size, and position in the image of a graphical element of the graphical overlay;

a dividing function configured to divide each horizontal line of pixels of the plurality of horizontal lines of pixels of the graphical overlay into a plurality of sequential line fragments, wherein all of the sequential line fragments have a same size;

a determining function configured to, for each line fragment of the plurality of sequential line fragments, determine, using the graphical overlay description, whether the line fragment overlaps a part of the graphical element; and a buffering function configured to, for each line fragment of the plurality of sequential line fragments:

on condition that the line fragment overlaps a part of the graphical element, buffer in the buffer memory, for the line fragment, information representing the part of the graphical element, and on condition that the line fragment does not overlap any part of the graphical element, buffer in the buffer memory, for the line fragment, a run-length coding representing identical pixels.

10. The device according to claim 9, wherein the information representing the part of the graphical element is pixel data representing the part of the graphical element.

11. The device according to claim 10, wherein the pixel data representing the part of the graphical element are obtained from a memory storing pixel data representing the graphical element.

12. The device according to claim 10, wherein the buffering function is further configured to, for each line fragment of the plurality of sequential line fragments:

on condition that the line fragment overlaps a part of the graphical element, buffering in the buffer memory, for the line fragment, a respective run-length coding representing identical pixels before and after the part of the graphical element in the line fragment.

13. The device according to claim 9, wherein the information representing the part of the graphical element is a run-length coding representing identical pixels for the part of the graphical element.

14. The device according to claim 9, wherein the obtained graphical overlay description further specifies content, size, and position in the image of a further graphical element of the graphical overlay, and wherein the buffering function is further configured to, for each line fragment of the plurality of sequential line fragments:

on condition that the line fragment overlaps a part of the further graphical element, buffer in a buffer memory, for the line fragment, information representing the part of the further graphical element, and on condition that the line fragment overlaps both a part of graphical element and a part of the further graphical element, buffer in a buffer memory, for the line fragment, information representing both the part of the graphical element and the part of the further graphical element.

15. The device according to claim 14, wherein the information representing both the part of the graphical element and the part of the further graphical element is pixel data representing a combination of the part of the graphical element and the part of the further graphical element.

\* \* \* \* \*